Dec. 27, 1955 J. YOUNG ET AL 2,728,672
POROUS CONTAINER OF A BEVERAGE INFUSION COMMODITY
AND VESSEL COVER PACKAGE COMBINATION
Filed April 14, 1955
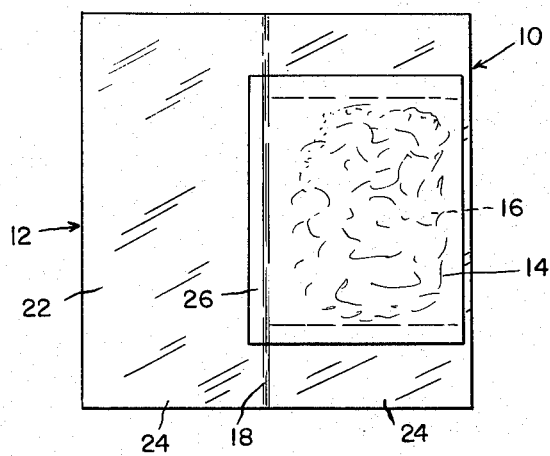
FIG.1.
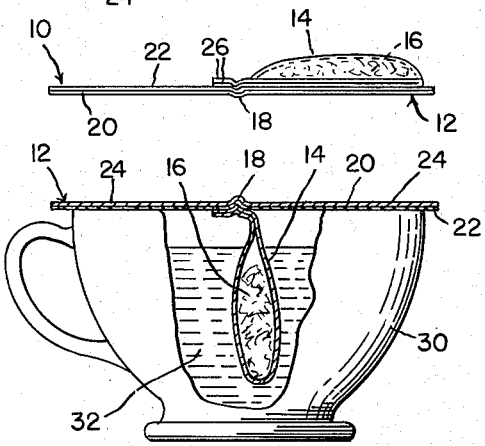
FIG.2.
FIG.3.
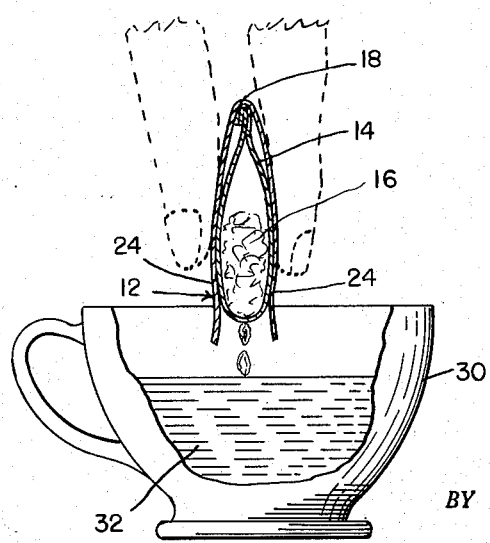
FIG.4.
INVENTORS
JULIUS YOUNG
BY BENJAMIN W. COLMAN
ATTORNEY

United States Patent Office 2,728,672
Patented Dec. 27, 1955

2,728,672
POROUS CONTAINER OF A BEVERAGE INFUSION COMMODITY AND VESSEL COVER PACKAGE COMBINATION

Julius Young, Detroit, and Benjamin W. Colman, Berkley, Mich.

Application April 14, 1955, Serial No. 501,367

5 Claims. (Cl. 99—77.1)

This invention relates to a novel and inventive package comprising a cover for a beverage making vessel combined with a porous container of a beverage infusion commodity, whereby a beverage is produced with a minimum of fuss and bother, the package embodying novel and inventive features of construction and functional characteristics of great advantage to consumer beverage makers.

The invention, in its preferred embodiment, comprises a sheet of paper arranged as a vessel cover and coated with a liquid impervious film of polyethylene, and a porous paper tea bag heat sealed to the polyethylene side of the vessel cover, so that in placing the cover over and upon a cup the tea bag depends therefrom into the cup liquid (water) for steeping and brewing by infusion until the desired strength of tea is obtained. The vessel cover and suspended tea bag is then lifted by the fingers to a position over the tea cup, the cover is folded down about both sides of the tea bag in compressing effect thereupon, and excess liquid is expressed from the tea bag into the cup. Thereafter, the moist but dripless tea bag, in its water proof cover, may be laid directly upon a table or other rest.

This application is a continuation-in-part of our earlier filed pending patent application, Serial No. 427,451, filed May 4, 1954, for "Porous Container of a Dry Infusion Commodity and Cover Combination."

The instant invention has for an object the provision of a relatively inexpensive and simple vessel cover made of paper and coated on at least one side with a liquid impervious film, such as polyethylene. Another object is the provision of a folding line, impressed or scored in the vessel cover, whereby the cover is foldable into two portions about a beverage infusion commodity container directly secured to the cover along the folding line. A further object is the provision of a vessel cover which is foldable about a porous container of a beverage infusion commodity into compressing effect thereupon to express excess liquid therefrom.

These and additional objects of the invention, features of construction and functional characteristics will become more apparent in the description given below, in which the terms are used for purposes of description and not of limitation. Referring now to the drawing annexed hereto and made an integral part hereof, Fig. 1 is a top plan view of the inventive package.

Fig. 2 is a side elevational view of the package.

Fig. 3 is a side elevational view, partially in section, of the package in use on a beverage making vessel.

Fig. 4 is a side elevational view, partially in section, of the vessel cover being compressed about the sides of the beverage infusion commodity container.

As shown in the drawing, the package combination 10 comprises a vessel cover member 12 and a porous container 14 of a beverage infusion commodity 16 directly secured to member 12 on one side thereof along a median fold line 18.

Vessel cover member 12 is preferably made of paper 20 coated on at least one side with a thin film, layer or lamina of substantially liquid-impervious polyethylene 22. Member 12 may be fabricated from a kraft type paper, as a preferred embodiment, or any other paper material to which a liquid impervious coating such as polyethylene may be anchored by coating or laminating processes. As an example, a 40# white bleached kraft paper with a 1 to 1½ mil coating of polyethylene has been found quite satisfactory for vessel cover member 12. Although both sides of base paper 20 may be coated, if desired, it has been found sufficient to coat merely one side thereof to obtain satisfactory results. In use, the coated side is brought into direct contact with the vapors rising from hot liquid, or the liquid itself, and moisture transmission through the polyethylene coating is substantially nil.

Flexible plastic thin film coatings, such as the vinyls, may also be used with the base paper 20, if they meet the standards of the Federal Food and Drug Act, are liquid impervious, sufficiently flexible to fold with the paper, and are heat sealable to the porous container 14.

The commodity container 14 is preferably made of a porous paper, currently in use with tea and coffee bags. Other materials, however, have been used for these containers, such as various types of loose woven textile materials, non-woven fabrics made of various synthetic materials, and such fibrous materials as spun glass, etc. The preferred container 14 is fabricated of highly porous paper of high wet strength and heat sealed into an envelope containing therewithin a quantity of the beverage infusion commodity 16.

The beverage infusion commodity 16 to which the package 10 readily lends itself, and which is one of several preferred materials is tea, in leaves or shreds as provided by tea leaf processors. Coffee and other beverage commodities are also packaged in porous containers, and these come within the purview of the invention.

The vessel cover member 12 is provided with a fold line 18, which substantially divides the member into two halves or portions 24, foldable on line 18 about the container 14. This line may be impressed when one edge portion 26 of container 14 is heat sealed to the polyethylene coating 22 of member 12. One method of forming the line 18 is to bear down on the container edge portion 26, and optionally on the member 12 to either side of the edge portion, with a hot bar that heats the polyethylene to plasticity and forces it into the porous structure of container 14, where it solidifies and anchors the container to member 12. A slight transverse depression is thus caused in the member 12 which is the fold line 18.

In the use of the package 10 for beverage making, a cup or vessel 30 containing a beverage making liquid 32, hot or cold as the need may be, is positioned to receive the vessel cover member 12 thereupon. Cover member 12 is of a size to substantially cover the entire open area of the vessel 30, particularly where hot liquids are used. This helps to maintain the temperature of the liquid at higher levels for a longer period of time, a very desirable object in making the beverage, tea. The container 14, suspended from the polyethylene coated underside of the member 12, is partially immersed in the liquid 32, Fig. 3, to brew or steep therein for the purpose of making the beverage by infusion of the commodity 16. The container 14 is usually positioned central in the vessel 30, thus achieving infusion of the commodity 16 from all sides and consequent full utilization of the commodity. In tea making, a brewing or steeping period of three minutes or more is recommended by leading tea processors and packagers. After sufficient time has been allowed for beverage infusion, the cover member 12 is grasped by the fingers and lifted up above the vessel 30, the container 14 remaining suspended over the vessel. Then, bringing the two cover member portions 24 downward, about fold line 18, upon both sides of container 14, the excess infusion liquid therein remaining is expressed out of the container and into the vessel 30, leaving a moist, but dripless, pouch within cover member 12. At this point, the beverage making has been completed, and package 10 is now a receptacle for a moist container 14 of infused commodity 16. Package 10 may be placed on a table or other rest without fear of leaking liquid. The polyethylene coating 22 serves to retain any small droplets that may be present after squeezing the container 14, and because of its liquid impervious character, moisture is not transmitted to the paper side of vessel cover member 12. Thus, it becomes a very excellent receptacle for the moist container and may be put directly upon a table without fear of spotting or leaking.

The preferred, but not the only, embodiment of the invention includes the use of a porous paper tea bag anchored by heat sealing to the polyethylene coating of a paper vessel covering member. Other applications of the invention will undoubtedly occur to those skilled in the art to which the invention pertains, and it is to be understood that various changes and modifications, in greater or lesser degree, may be made without departing from the essence of the invention.

We claim:

1. In a beverage infusion package, a member consisting of paper coated with a thin layer of a liquid impervious flexible heat sealable plastic material, said member being designed to cover a vessel for beverage making and provided with a median line for folding said cover member into two halves, a porous bag containing a beverage infusion commodity secured by heat sealing directly to the coated side of said cover member along said median line, whereby said halves may be brought together over said bag after infusion to express excess liquid from said bag.

2. In a beverage infusion package, a cover member consisting of paper coated with a thin layer of heat sealable polyethylene, said member being arranged substantially uniplanar and designed to cover a vessel for beverage making and provided with a median line for folding said cover member into two portions, a porous bag containing a beverage infusion commodity secured by heat sealing directly to the coated side of said cover member along said median line, whereby said cover member portions may be brought together over said bag after infusion to express excess liquid from said bag.

3. In a beverage infusion package, a substantially flat member to cover a vessel for beverage making consisting of paper coated on at least one side with a thin layer of heat sealable polyethylene, said cover member being provided with a median line for folding said member into two substantially equal portions, a porous container containing a beverage infusion commodity secured by heat sealing directly to a coated side of said cover member along said median line so as to depend therefrom into said vessel, whereby after infusion of said container said cover member portions may be brought together about said container to express excess liquid therefrom.

4. In a beverage infusion package for use with a beverage making vessel, a cover member for said vessel consisting of paper coated on at least one side with a layer of heat sealable polyethylene, said cover member being provided with a median line for folding said member into two side portions, a porous paper container containing a beverage infusion commodity having an edge portion thereof secured by heat sealing directly to a coated side of said paper cover member along said median line so as to depend therefrom into said vessel substantially through the center thereof, whereby said cover member side portions may be folded together about the sides of said container after infusion thereof to express excess liquid from said container.

5. In a beverage infusion package for use with a beverage making vessel, a member designed to cover said vessel consisting of paper coated with a thin layer of polyethylene on the side contiguous with said vessel, said coating being substantially liquid impervious and heat sealable, a porous container containing a beverage infusion commodity having an edge portion thereof directly secured by heat sealing to said coated side of said cover member along a line passing substantially through the center thereof so as to depend therefrom into said vessel, said vessel cover member being foldable along said line of securement into two portions, whereby said portions may be folded together about the sides of said container after infusion thereof to express excess liquid from said container.

References Cited in the file of this patent

UNITED STATES PATENTS

| | | |
|---|---|---|
| 2,192,605 | Salfisberg | Mar. 5, 1940 |
| 2,606,836 | McCabe | Aug. 12, 1952 |
| 2,614,934 | Trotman | Oct. 21, 1952 |